United States Patent
Namboodiri et al.

(10) Patent No.: US 8,374,240 B1
(45) Date of Patent: Feb. 12, 2013

(54) IMAGE FRAME MANAGEMENT

(75) Inventors: Vipin Namboodiri, Bangalore (IN);
Keepudi Muni Babu, Bangalore (IN);
Mainak Biswas, Santa Cruz, CA (US)

(73) Assignee: Marvell International Ltd. (BM)

( * ) Notice: Subject to any disclaimer, the term of this patent is extended or adjusted under 35 U.S.C. 154(b) by 694 days.

(21) Appl. No.: 12/499,932

(22) Filed: Jul. 9, 2009

Related U.S. Application Data

(60) Provisional application No. 61/079,637, filed on Jul. 10, 2008.

(51) Int. Cl.
*H04N 7/12* (2006.01)

(52) U.S. Cl. .................................... 375/240.12

(58) Field of Classification Search .............. 375/240.12
See application file for complete search history.

(56) References Cited

U.S. PATENT DOCUMENTS

| | | | |
|---|---|---|---|
| 4,579,455 A * | 4/1986 | Levy et al. ................ | 356/394 |
| 5,909,251 A | 6/1999 | Guichard et al. | |
| 6,058,140 A * | 5/2000 | Smolenski .............. | 375/240.16 |
| 2002/0171759 A1 | 11/2002 | Handjojo et al. | |
| 2003/0058218 A1 | 3/2003 | Crane et al. | |
| 2004/0163006 A1 | 8/2004 | Rosen | |
| 2004/0252759 A1 * | 12/2004 | Winder et al. ............ | 375/240.12 |
| 2005/0002646 A1 * | 1/2005 | Sato ..................... | 386/68 |
| 2006/0182357 A1 * | 8/2006 | Liu et al. ................ | 382/239 |
| 2007/0024703 A1 * | 2/2007 | Conklin .................. | 348/97 |
| 2007/0171280 A1 * | 7/2007 | Tian et al. ............... | 348/97 |
| 2007/0297513 A1 | 12/2007 | Biswas et al. | |
| 2008/0043154 A1 * | 2/2008 | Tang et al. .............. | 348/700 |
| 2008/0069221 A1 | 3/2008 | Ohwaki et al. | |
| 2008/0088746 A1 | 4/2008 | Walls | |
| 2008/0122973 A1 | 5/2008 | Iwasaki et al. | |
| 2008/0151108 A1 * | 6/2008 | Doswald ................ | 348/456 |
| 2008/0151109 A1 | 6/2008 | Doswald | |
| 2009/0016618 A1 | 1/2009 | Zhou | |
| 2009/0074328 A1 | 3/2009 | Matsumoto et al. | |
| 2009/0148058 A1 * | 6/2009 | Dane et al. .............. | 382/251 |
| 2009/0161766 A1 * | 6/2009 | Bronstein et al. ........ | 375/240.23 |
| 2010/0149415 A1 | 6/2010 | Znamenskiy et al. | |

FOREIGN PATENT DOCUMENTS

| | | |
|---|---|---|
| EP | 1 198 137 A1 | 4/2002 |
| EP | 1 592 247 A1 | 11/2005 |

OTHER PUBLICATIONS

US Patent and Trademark Office Non-Final Office Action issued in co-pending U.S. Appl. No. 12/748,698, filed Mar. 29, 2010, having a Notification Date of Aug. 17, 2012.

* cited by examiner

*Primary Examiner* — Mehrdad Dastouri
*Assistant Examiner* — Mohammed Rahaman

(57) ABSTRACT

Systems, methods, and other embodiments associated with image frame management are described. According to one embodiment, an apparatus includes classifier logic to categorize frames that represent an image as either reference frames or non-reference frames, where the categorization is based, at least in part, on motion vectors between the frames. The apparatus further includes management logic to store the reference frames and to delete the non-reference frames. Image generation logic may then reproduce the image by using the stored reference frames.

18 Claims, 11 Drawing Sheets

IMAGE FRAME MANAGEMENT

CROSS REFERENCE TO RELATED APPLICATIONS

This application claims the benefit of U.S. provisional application Ser. No. 61/079,637 filed on Jul. 10, 2008, which is hereby wholly incorporated by reference.

BACKGROUND

A video capture apparatus can record a moving image as a series of still frames. The series of still frames may be digitally recorded as image data. When outputted, the series of still frames are displayed at a consistent rate. The consistent rate allows a viewer to see the image captured by the apparatus as a moving picture. Before viewing the series of image frames, the image may be stored at a local media player. When stored, the series of frames can consume a relatively large amount of computer memory. Therefore, video compression can be used to conserve memory.

In video compression, algorithms are applied to the image data. The algorithms attempt to reduce an amount of storage space that the image data consumes. When the image data is displayed, a reverse algorithm is applied to the image data. The reverse algorithm allows a near identical image or an identical image of the retained image to be displayed. Many algorithms used in compression affect the quality of the displayed image and may be inefficient. A more advantageous frame and storage management system may be desired.

SUMMARY

In one embodiment an apparatus includes classifier logic to categorize frames that represent an image as either reference frames or non-reference frames. The categorization is based, at least in part, on motion vectors between the frames. Management logic functions to store the reference frames and to delete the non-reference frames. Image generation logic functions to reproduce the image by using the stored reference frames.

In another embodiment, a method includes identifying motion vectors between frames of an image, where the frames of the image are identified as reference frames or non-reference frames based on a result produced through evaluation of the identified motion vectors. The non-reference frames are discarded and the reference frames are stored. The stored reference frames are used to regenerate the image.

In another embodiment, the method further includes evaluating the identified motion vectors to produce the result. The frames of the image are identified as reference frames or as non-reference frames based, at least in part, on the result. The image is then regenerated from the stored reference frames.

In another embodiment, a system comprises: means for evaluating motion vectors of image data, where the motion vectors are between frames that form the image data; means for classifying the frames as reference frames or as non-reference frames based, at least in part, on the evaluation; means for segregating the classified frames, where the reference frames are retained in a memory and the non-reference frames are discarded; and means for reproducing the image data from the retained reference frames.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
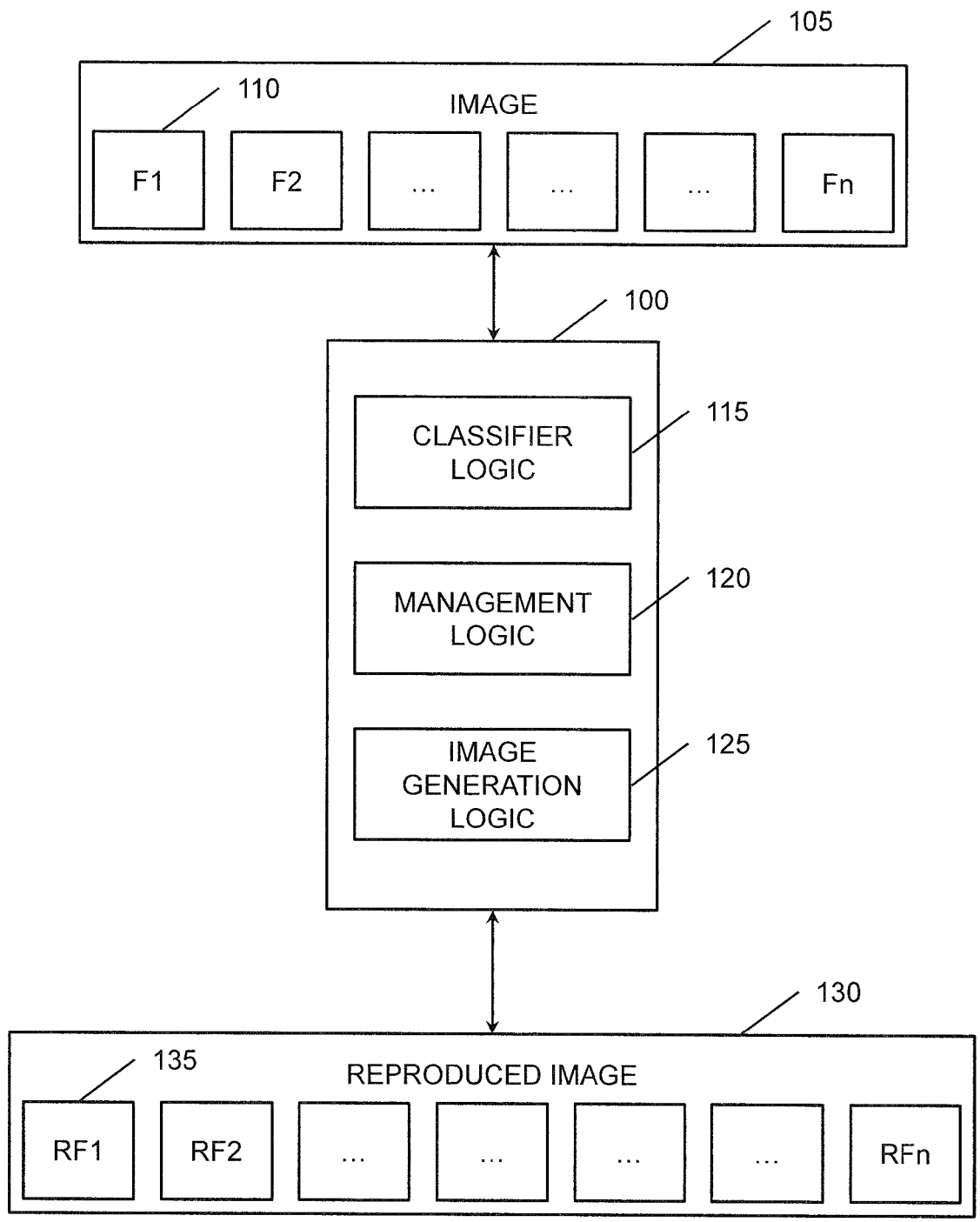
FIG. 1 illustrates one embodiment of an apparatus that processes an image.

Described herein are example systems, methods, and other embodiments associated with digital image data processing. One embodiment relates to managing frames and storage buffers in relation to image regeneration. In one example, image data may be represented as a series of frames and the frames may be organized in a cadence. The cadence may be a pattern where similar frames are arranged together. For example in a 3:2 cadence, three similar frames are presented next to two similar frames. A 3:2 pattern can repeat for the remainder of the frames. Based on the cadence, reference frames and non-reference frames may be identified. The reference frames may be stored. Non-reference frames can be deleted because a relatively high level of information in the non-reference frames is repetitive to what is already captured in the stored reference frames. Thus, fewer frames can be stored without having a substantial loss in image quality.

According to one embodiment, a device collects a frame set. Upon collection, a frame set cadence is detected. Reference frames are identified by applying the cadence to the frame set. The device retains the reference frames in storage buffers and deletes the non-reference frames. In one embodiment, the non-reference frames may be frames that substantially repeat the same information as a previous frame. Deleting frames saves memory space. To regenerate the image data, the device performs interpolation on the reference frames to produce interpolated frames. The interpolated frames are produced to represent information of the deleted non-reference frames. This allows for smooth transition between reference frames when the reference frames are displayed. The interpolated frames and the reference frames are combined together to create a reproduction of the original image. Therefore, a reproduced image can be provided while consuming a smaller number of storage buffers. Consuming a smaller number of storage buffers can increase device performance, lower cost, and so on.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus 100 that processes an image 105. The image 105 includes frames 110. The image 105 may be a video, film, and so on. When multiple frames 110 are played/displayed at a selected rate, a video is created. However, some of these frames may contain near identical information. This could be caused by, for example, an image capture device that created multiple frames for one still image. Therefore, the image 105 may include frames that are nearly identical to previous frames. Since little to no new information is included in repeated frames, repeated frames can be deleted and frames that retain substantially different information may be retained. Repeated frames can be characterized as non-reference frames. In addition, frames with new information can be characterized as reference frames.

The apparatus 100 includes classifier logic 115 that categorizes frames 110 that represent the image 105. The frames 110 are characterized as either reference frames or non-reference frames. In one embodiment, the categorization is based, at least in part, on motion vectors between the frames. For example, a frame with a relatively large amount of motion vector change with a previous frame may be categorized as a reference frame. A frame with a relatively small amount of change with a previous frame may be categorized as a non-reference frame.

The apparatus 100 includes management logic 120 to store the reference frames and to delete the non-reference frames. In one embodiment, the reference frames are stored in buffers. Image generation logic 125 reproduces or regenerates the image 105 by using the stored reference frames. Based on the stored reference frames, the image generation logic 125 outputs a reproduced image 130 with reproduced frames 135. The reproduced image 130 and/or reproduced frames 135 may be substantially similar and/or identical to the image 105 and/or frames 110, respectively. Therefore, an image can be reproduced with similar quality to an original image while using a fraction of the storage space during imaging processing.

Figure 2:
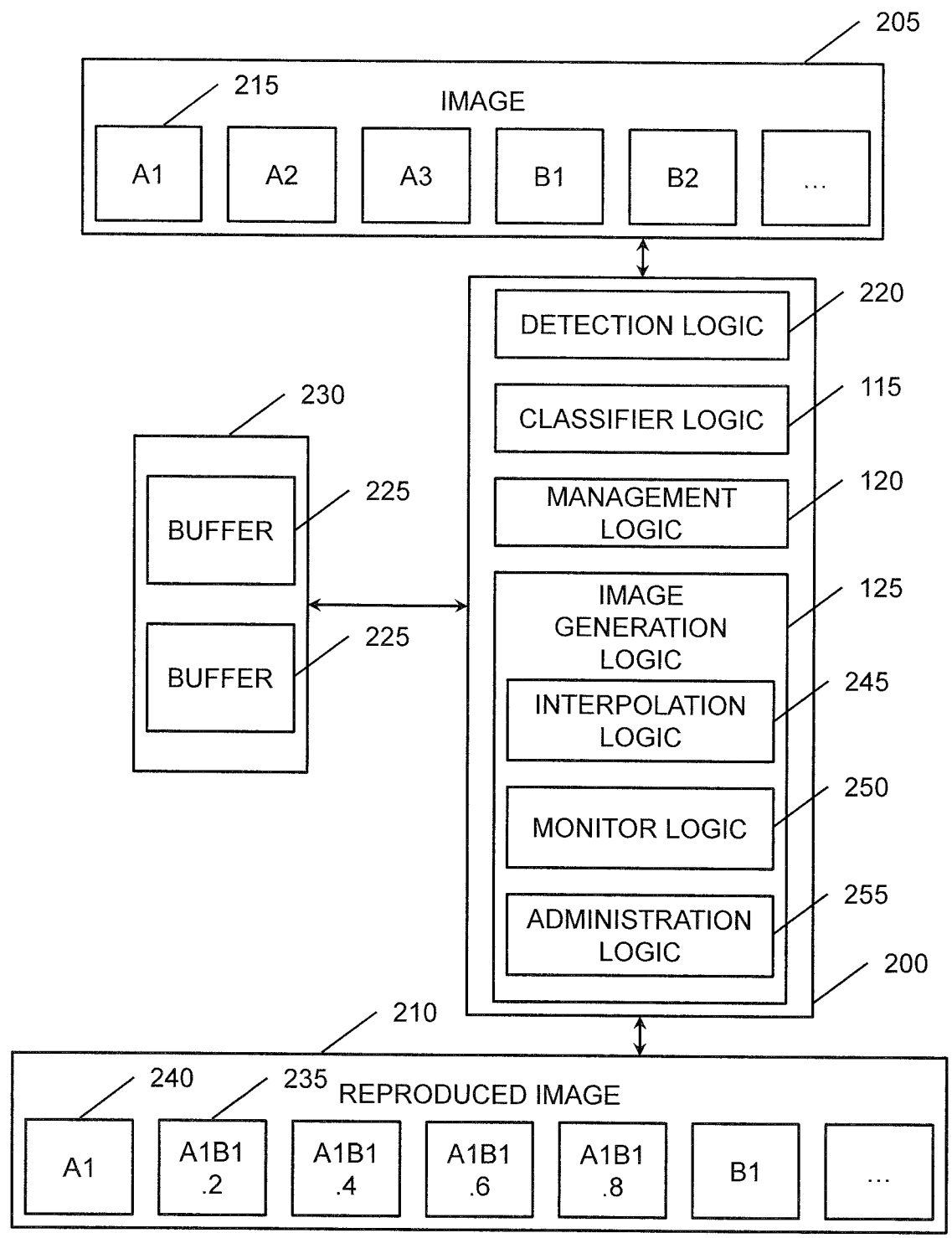
FIG. 2 illustrates one embodiment of an apparatus that transforms an image into a reproduced image.

FIG. 2 illustrates one embodiment of an apparatus 200 that transforms an image 205 into a reproduced image 210. Apparatus 200 includes similar components as apparatus 100 (shown in FIG. 1) that are labeled with the same reference number.

When processing the data of image 205, the frames 215 of the image 205 may be arranged in a cadence. The cadence may be a frame count for how many frames with nearly identical information are grouped together. An example frame cadence may be A1, A2, A3, B1, B2, C1, C2, C3, D1, D2, E1, and so on.

Frames with the same alphabetic letter (e.g. "A") represent a repeated or nearly identical frame. Thus, A1, A2, and A3 indicate that three frames repeat nearly identical information before the next group begins with frame B1. Therefore, the example frame cadence may be considered a 3:2 cadence. The 3:2 cadence can be characterized as three frames of nearly identical information grouped together followed by two frames of nearly identical information grouped together, and then the 3-2 groupings repeat. The apparatus 200 includes detection logic 220 to detect and determine the cadence of the image 205.

Classifier logic 115, as discussed in FIG. 1, categorizes frames that represent the image 205 as either reference frames or non-reference frames. In one embodiment, the classifier logic 115 categorizes the frames 215 based, at least in part, on the cadence. Management logic 120 stores the reference frames and deletes the non-reference frames. In one embodiment, the reference frames are stored in one or more buffers 225 that are part of a buffer group 230. By deleting the non-reference frames, fewer buffers 225 are consumed. The apparatus 200 includes image generation logic 125 to reproduce the image 205 by using the reference frames stored in the buffers 225.

In one embodiment, frames 215 of the image 205 are collected and single bits of frames are retained in a map. Vectors between the bits are evaluated. Based on the evaluation, a determination is made on which frames are reference frames. Reference frames are stored and non-reference frames (e.g., a Red-Green-Blue (RGB) component of a non-reference frame) are not retained. Thus, less storage is used since the map and reference frames are stored while other information may be disregarded. Based on the stored reference frames, the image generation logic 125 can reproduce an image.

In another embodiment, the image generation logic 125 performs an interpolation on the stored reference frames to reproduce one or more of the deleted non-reference frames. In one example, the interpolation is a mathematical operation that estimates data. The interpolation may be used to estimate the data that is lost by deleting the non-reference frames. Performing interpolation on the reference frames facilitates production of interpolated frames 235. The Interpolated frames 235 are frames that replace the deleted non-reference frames in the reproduced image 210. The deletion of non-reference frames leaves gaps between reference frames. The image generation logic 125 regenerates the image 205 with a reproduced image 210 by combining reference frames and interpolated frames. Thus the interpolated frames 235 are used to fill in the gaps between reference frames 240 (e.g. A1, B1, etc) in the reproduced image 210.

In one embodiment, the image generation logic 125 employs interpolation logic 245 to perform an interpolation on a reference frame of the reference frames. In this embodiment, the management logic 120 stores the reference frame in a buffer 225. Monitor logic 250 determines that the interpolation on the reference frame is complete. Administration logic 255 deletes the reference frame from the buffer 225 after the monitor logic 250 determines that the interpolation is complete. Deletion of the reference frame frees the buffer 225 to be used again by the management logic 120.

The following is an example operation of the previous embodiment. Motion vectors between frames can be evaluated and a cadence for an image can be determined. Suppose the image data has a 3:2 cadence and includes reference frames A1, B1, and C1. A number of interpolated frames used can be a function of output frequency and the cadence. In this example, suppose an output frequency of 120 Hertz is used and it is determined that the frequency can facilitate use of four interpolated frames between reference frames. Equally dividing a range from 0 to 1 in four units gives frames at 0.2, 0.4, 0.6, and 0.8. The four interpolated frames between reference frames A1 and B1 can thus be represented as: A1B1.2, A1B1.4, A1B1.6, and A1B1.8.

In one example, the A1B1.2 frame indicates that it is 20% away from the A1 frame and thus 80% away from the B1 frame. Since A1 is closer, A1 is used to generate the interpolated frame A1B1.2. Once A1B1.2 and A1B1.4 are generated, the remaining interpolated frames are generated from B1 since B1 is the closer reference frame. Therefore, A1 is no longer used. To increase efficiency, frame A1 is deleted from the buffer 225 and replaced by the next reference frame C1. Thus, C1 is ready for use as soon as processing of frame B1 is complete. This can be considered as pre-loading C1 while B1 is being used and A1 is no longer needed. Therefore, an operating speed of the apparatus 200 can be improved since C1 is ready when appropriate.

Figure 3:
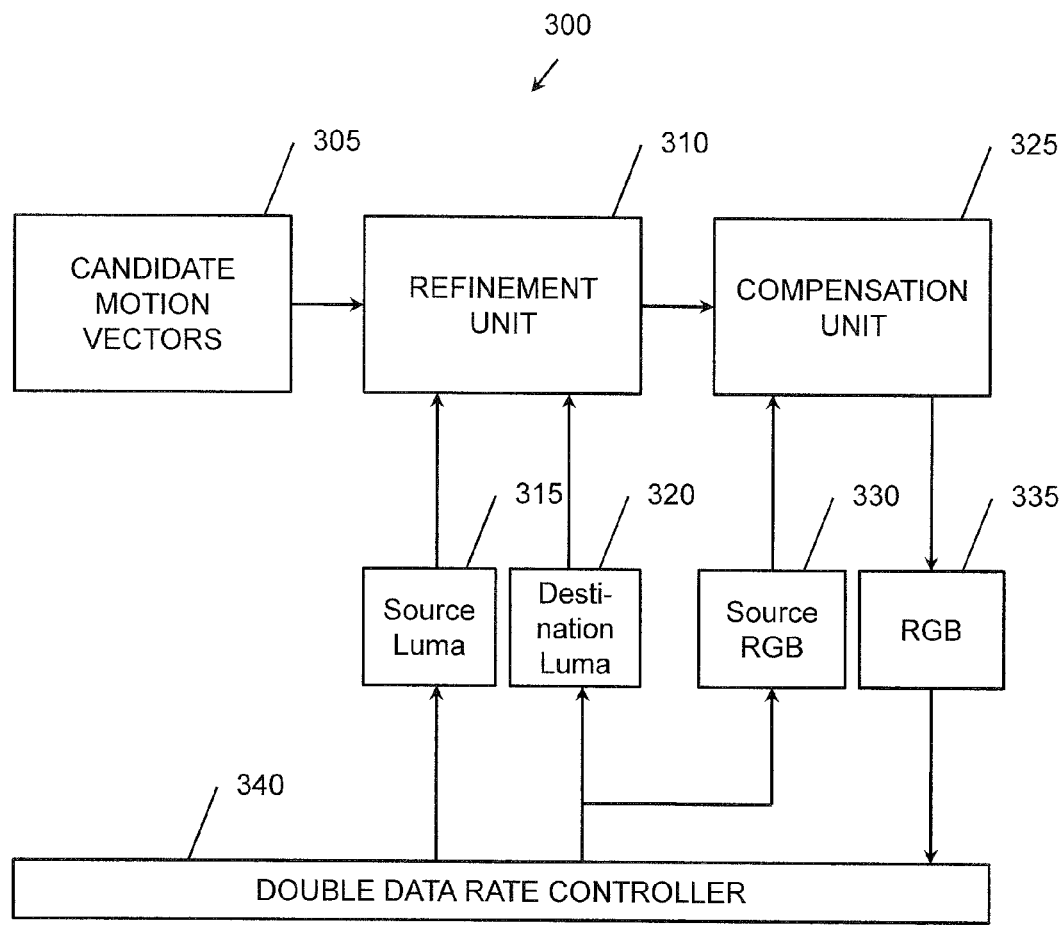
FIG. 3 illustrates one embodiment of a sum of absolute differences (SAD) engine.

FIG. 3 illustrates one embodiment of a sum of absolute differences (SAD) engine 300 that may be part of the interpolation logic 245 of FIG. 2. The SAD engine 300 operates on reference frames to produce the interpolated frames. The SAD engine 300 is configured to find motion vectors in pixels across different frames. An example motion vector includes a direction an object moves from one frame to another. For example, an image of a car can move from one location to another location in two consecutive reference frames. The SAD engine 300 is configured to analyze image properties to detect the movement of objects (e.g. the car) from one location to another between frames.

The image generation logic 125 of FIG. 1 or 2 can include the SAD engine 300. The SAD engine 300 produces interpolated frames from the stored reference frames. As previously explained, the interpolated frames may represent one or more of the deleted non-reference frames. The image generation logic 125 of FIG. 1 combines the reference frames and interpolated frames to reproduce the image.

The following is an example operation of the SAD engine 300. The SAD engine 300 obtains candidate motion vectors 305 from firmware. The candidate motion vectors 305 are fed to a refinement unit 310 that takes an SAD of frames A1-B1 over a kernel. An example kernel can be 5×3, so the SAD is |A1−B1|/15.

This can be performed in one embodiment by taking luma information (e.g., source luma 315, destination luma 320) from frames A1 and B1. A compensation unit 325 (e.g., a compensation and dynamic averaging unit) collects the candidate motion vectors, source RGB 330 and SAD. Based, at least in part, on the SAD, the compensation and dynamic averaging unit assigns a candidate motion vector from the candidate motion vectors 305 to a particular pixel. Based on a reference frame and motion vector, a shifted value of a reference frame is determined and outputted as an RGB 335 to a double data rate controller 340.

Figure 4:
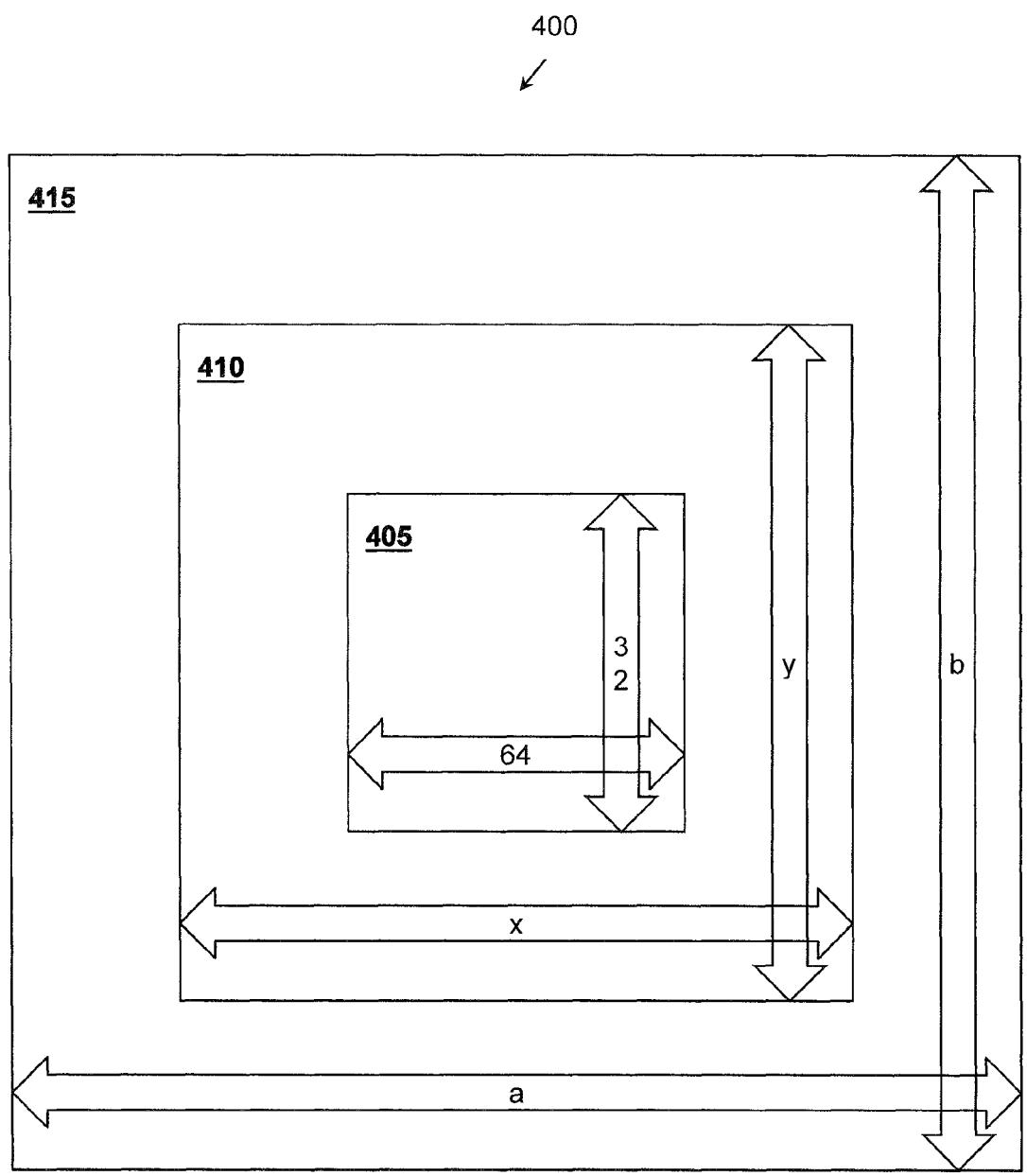
FIG. 4 illustrates one embodiment of a frame group used by the SAD engine.

FIG. 4 illustrates one embodiment of a frame group 400 that may be used by the SAD engine 300 of FIG. 3. The frame group 400 is used to search for candidate motion vectors. The frame group includes a source RGB 405, an interpolated RGB 410, and a destination luma 415. For example, suppose the source RGB 405 has a size of 64×32 pixels and is the reference frame used for interpolation. A search range of the SAD engine can be variable based on an interpolation ratio. For example, in frame A1B1.2 (shown in FIG. 2), the interpolation ratio is 0.2. The search range is the area that is to be searched when testing a candidate motion vector. A result of the search is used to produce an interpolated frame. The following are example equations that may be used to determine the search range. Of course, other formulas can be used.

$$x = RGB_x + 2*(f*MaxMV_x) + 2k_x + 2d_x$$

$$y = RGB_y + 2*(f*MaxMV_y) + 2k_y + 2d_y$$

$$a = RGB_X + 2*((1-f)*MaxMV_x) + 2k_x + 2d_x$$

$$b = RGB_y + 2*((1-f)*MaxMV_y) + 2k_y + 2d_y$$

'$RGB_x$' is a search length (e.g., 64), '$RGB_y$' is a search width (e.g., 32), T is the interpolation ratio (e.g., 0.2, 0.4, 0.6, 0.8), $MaxMV_x$ is a maximum motion supported in the 'x' dimension, $MaxMV_y$ is a maximum motion supported in the 'y' dimension, $(k_x, k_y)$ is a SAD kernel size, $(d_x, d_y)$ is a kernel used in dynamic averaging. The search range can be determined and used to locate motion vectors. The located motion vectors may be used to produce an interpolated frame that is outputted to a double data rate controller.

In another embodiment, the SAD engine 300 of FIG. 3 operates with the double data rate controller. In one embodiment, the double data rate controller uses a fixed bandwidth. The SAD engine 300 of FIG. 3 operates within the fixed bandwidth and may produce as many interpolated frames as possible with the fixed bandwidth. In one embodiment, the bandwidth is kept constant. However, having a fixed bandwidth may lead to inconsistent interpolated frame outputs. For example, interpolation frames with 0.4 and 0.6 interpolation ratios can take longer since more deviations may exist from the nearest reference frames than 0.2 and 0.8 frames.

In another embodiment, the SAD engine 300 of FIG. 3 functions on a fixed number of pixels per clock cycle. Therefore, the bandwidth may vary based on an amount used to process a number of pixels. This may produce more consistent frames that can lead to a smoother output that by using a fixed bandwidth. Therefore, the SAD engine 300 of FIG. 3 is configured to allow for more certainty in operation depending on a configuration selected. Thus, improved image processing may be provided.

Figure 5:
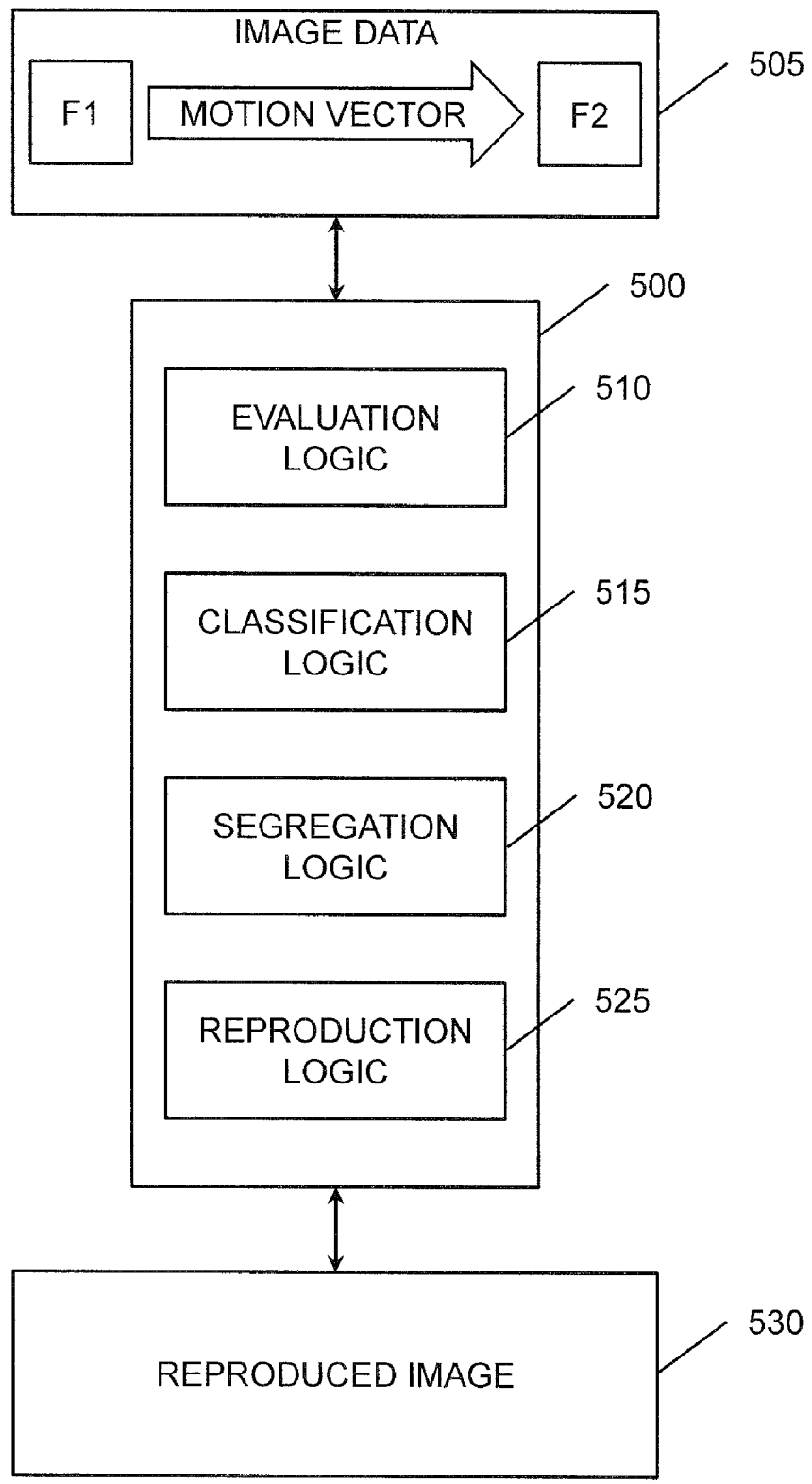
FIG. 5 illustrates one embodiment of a system for processing an image with image data.

FIG. 5 illustrates another embodiment of a system 500 for processing image data 505. The image data 505 may be formed of digital image data, for example video data that includes a series of still images defined by frames. Evaluation logic 510 functions to analyze the image data 505 and to evaluate motion vectors of the image data 505. As previously explained, motion vectors occur for an image object when its location moves between frames in the image data 505. Classification logic 515 functions to classify the frames as reference frames or non-reference frames based, at least in part, on the evaluation. Segregation logic 520 functions to segregate the classified frames. In one embodiment, the segregation logic 520 retains/stores the reference frames in a memory and discards the non-reference frames. Reproduction logic 525 functions to generate a reproduced image 530 from the retained reference frames. The reproduced image 530 is a reproduced image of the image data 505. Therefore, the reproduced image 530 may be produced without retaining non-reference frames and thus reducing the amount of memory consumed.

Figure 6:
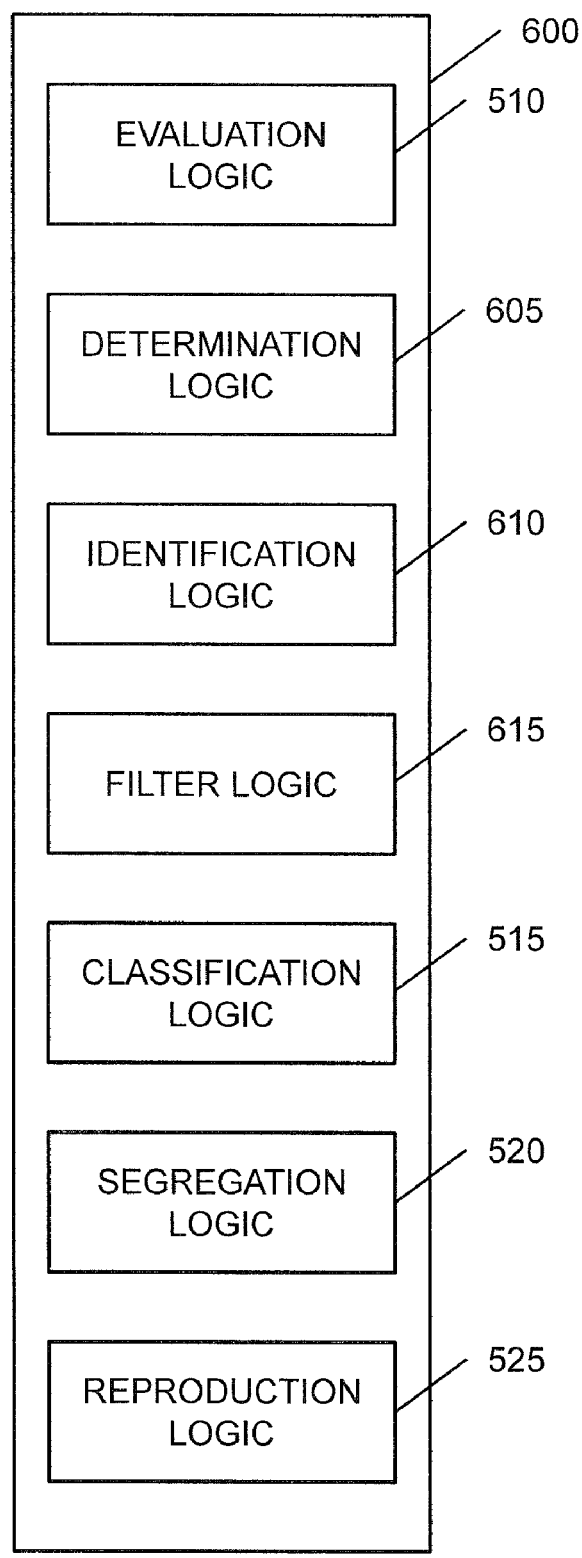
FIG. 6 illustrates one embodiment of a system for pre-processing an image.

FIG. 6 illustrates another embodiment of a system 600 for pre-processing image data that may include different types of content. For example, the majority of an image may include film data and the minority of the image may include text (e.g. scrolling text along the bottom of the image). Evaluation logic 510 functions to analyze the image data to identify different image characteristics. For example, the film and scrolling text may have different cadences. In one example, the film may have a 3:2 cadence and the scrolling text may have 2:2 cadence. Before processing the image, the system 600 functions to identify the multiple data types and extract out the minority content (e.g. the scrolling text).

Determination logic 605 functions to determine whether the image data includes multiple data types. The determination may be based, at least in part, on the analysis of the evaluation logic 510. Using the image characteristics identified by the evaluation logic 510, data types may be associated with the image characteristics. Identification logic 610 functions to identify a primary data type of the image data, where the primary data type is the type most prevalent in the image. Filter logic 615 functions to filter out non-primary data types from the image data. Therefore, the filtered out data and the remaining data can be processed independently and subsequently combined to form a reproduced image.

Classification logic 515 functions to classify frames. The classification logic 515 can operate after the filter logic 615 performs its functions. The system 600 can also include segregation logic 520 and reproduction logic 525 as previously discussed with reference to FIG. 5. Therefore, an image can be reproduced while consuming less storage buffer resources, even if the image includes more than one data type.

Figure 7:
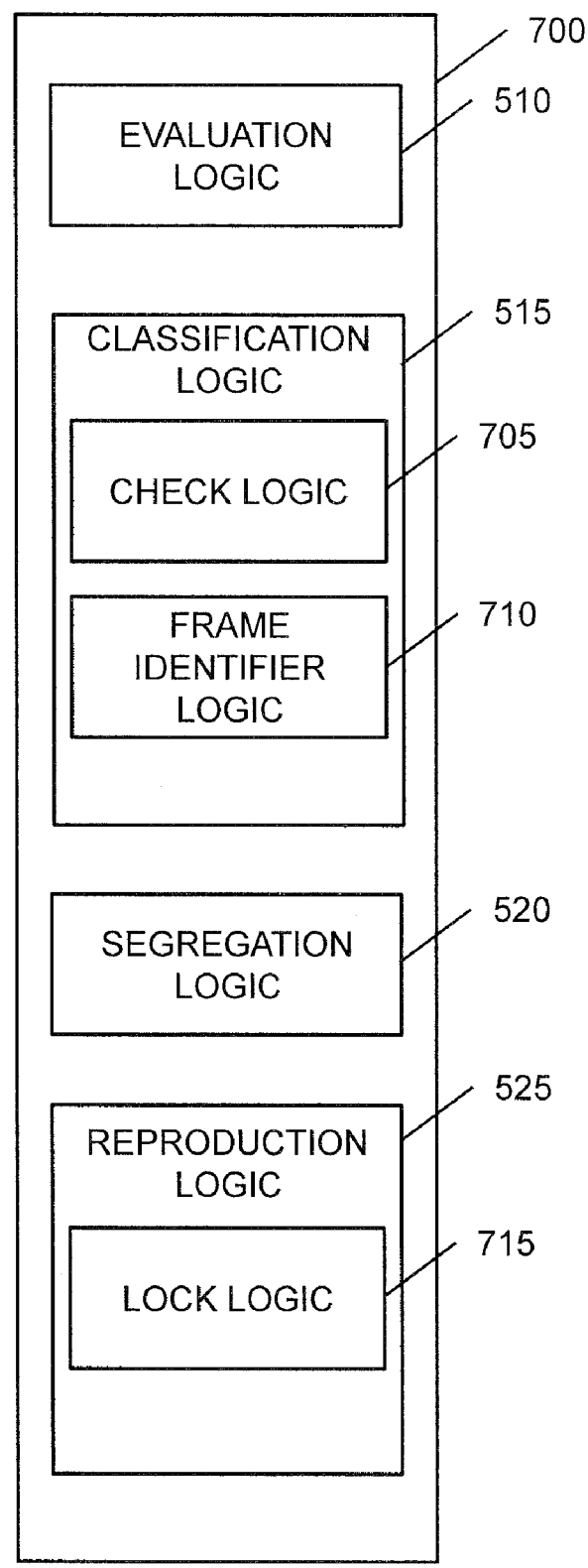
FIG. 7 illustrates one embodiment of a system for image processing in relation to a frame cadence.

FIG. 7 illustrates one embodiment of a system 700 for image processing in relation to a frame cadence. The system 700 includes evaluation logic 510 and classification logic 515 as previously discussed. The evaluating logic 510 may determine the frame cadence as an image characteristic. The classification logic 515 may employ check logic 705 that functions to identify a first reference frame of a reference frame sequence.

With the first reference frame identified, remaining reference frames can be identified by counting frames according to the cadence. For example, in a 3:2 cadence after a first reference frame is found, a $4^{th}$ frame, $6^{th}$ frame, $9^{th}$ frame, $11^{th}$ frame, and so on, are also reference frames. Non-reference frames can then be identified as the $2^{nd}$ frame, $3^{rd}$ frame, $5^{th}$ frame, and so on. Frame identifier logic 710 functions to identify these frames. Therefore, the frame identifier logic 710 operates to identify at least one other reference frame by applying the cadence against the first reference frame. Additionally, the frame identifier logic 710 may function to identify at least one non-reference frame by applying the cadence against the first reference frame.

The system 700 may also include segregation logic 520 and reproduction logic 525 as previously discussed with reference to FIG. 5. The reproduction logic 525 functions to reproduce the image data from the stored reference frames. In one embodiment, the reproduction logic 525 may include lock logic 715. The lock logic 715 functions to lock on to a first reference frame of the image data. This can be performed in conjunction with the frame identifier logic 710 that identifies the first reference frame of the image data. By applying the cadence, reference frames can be quickly identified and less storage/buffer space may be used.

Figure 8:
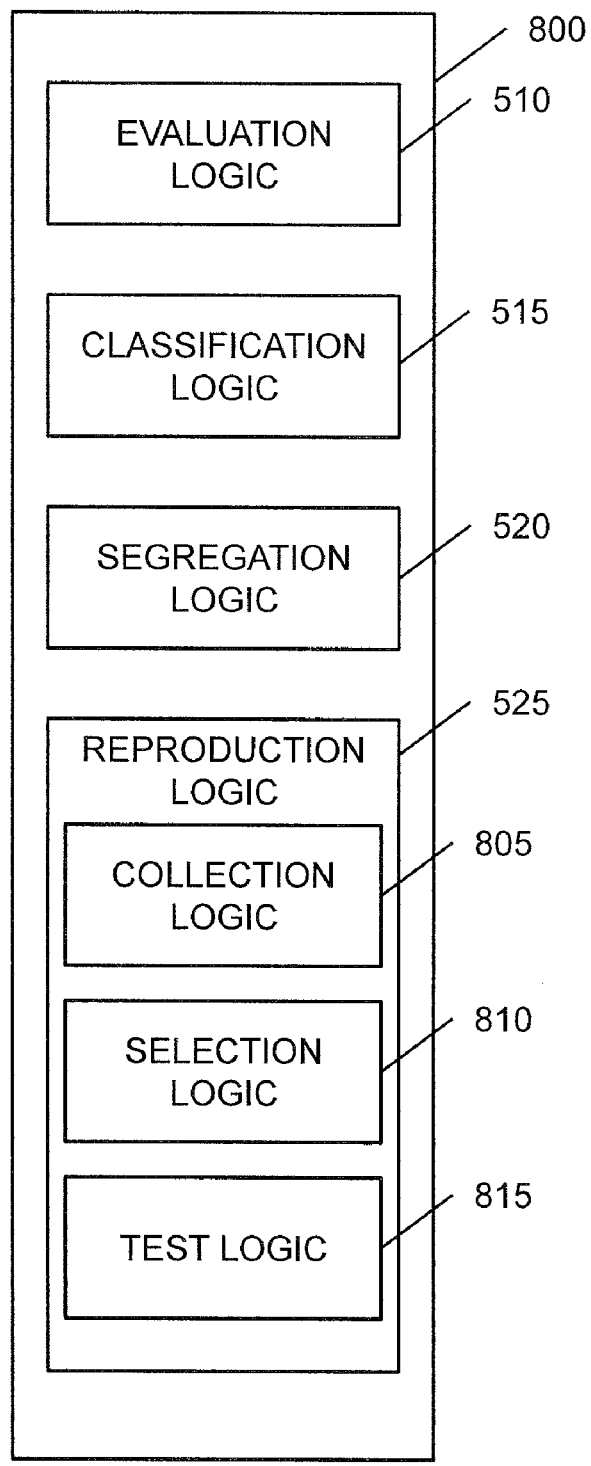
FIG. 8 illustrates one embodiment of a system for image processing.

FIG. 8 illustrates another embodiment of a system 800 for image processing. The system 800 includes evaluation logic 510, classification logic 515, segregation logic 520, and reproduction logic 525 as previously discussed.

In one embodiment, the reproduction logic 525 includes collection logic 805. The collection logic 805 functions to collect candidate motion vectors. For example, the candidate motion vectors may be collected from firmware. The collection logic 805 may generate the candidate motion vectors itself, obtain the candidate motion vectors from firmware or other component, and so on. Selection logic 810 functions to select a retained reference frame. As previously explained, reference frames from the image data are stored in one or more buffers. In one embodiment, the selection logic 810 selects frames in sequence (e.g., frame A1, B1, C1, and so on). Test logic 815 functions to test the candidate motion vectors against pixels of the selected retained reference frame. The testing may be based on a search of the selected retained reference frame. In addition, a search area used in the search may be a function of an interpolation ratio. It is to be appreciated that the collection logic 805, selection logic 810, and/or test logic 815 may be implemented as part of a sum of absolute differences (SAD) engine (e.g. SAD engine 300 of FIG. 3). In another embodiment, the reproduction logic 525 interpolates the reference frames to obtain frames representing the discarded non-reference frames. By combining the reference frames and the interpolated frames, an image can be produced that is similar to the original image while consuming a smaller amount of storage space.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 9:
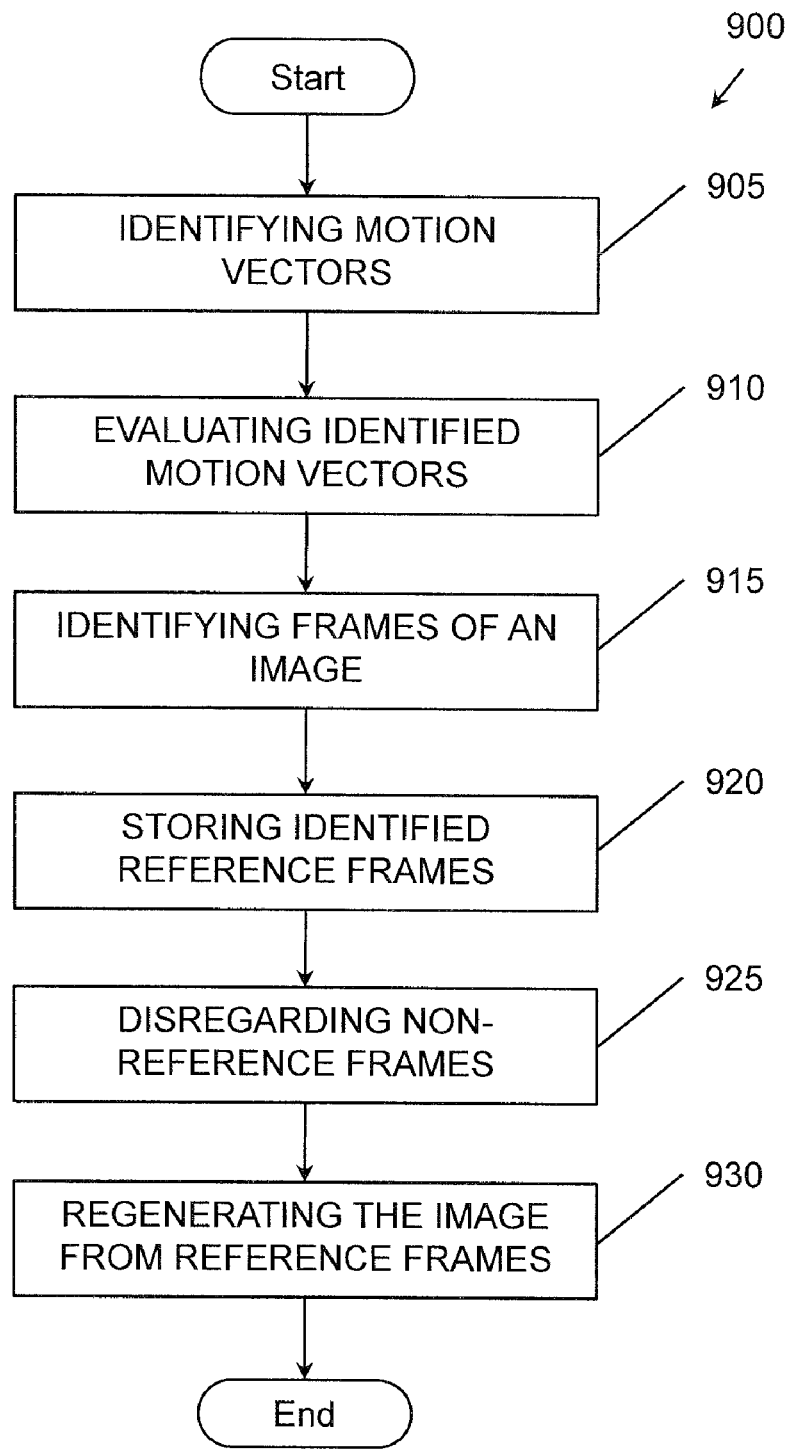
FIG. 9 illustrates one embodiment of a method for processing an image.

FIG. 9 illustrates one embodiment of a method 900 for processing image data. Image processing may include storing less data than an entire original image. A resulting image is generated that is at least substantially similar to the original image. For example, the original image may be transmitted from a broadcaster and received at a local media player. Instead of storing and saving the entire image when it is received and displaying the image, a portion of the image is saved. The saved portion is then used to create a reproduced image. Use of the method 900 can reduce overall storage usage and may reduce the cost of a device since less memory may be used.

An image is collected and designated for processing. The image is evaluated to identify motion vectors between frames of the image (block 905). The identified motion vectors are evaluated to produce a result (block 910). In one embodiment, the result is an image cadence. Frames of the image are identified as reference frames or as non-reference frames (block 915). The identification is based, at least in part, on the result. The reference frames are stored (block 920) and non-reference frames are disregarded (block 925). The image may be regenerated from the stored reference frames (block 930). In one embodiment, the method 900 operates with blocks 905, 920, and 925 without performing blocks 910, 915, and 930. In one example, blocks 905, 920, and 925 can be implemented by a front-end engine.

The regenerated image produced at block 930 may be identical or nearly identical to the original image. Thus, an image can be regenerated without consuming excess storage. In one embodiment, regenerating the image from the stored reference frames includes performing an interpolation on the stored reference frames. Performing the interpolation on the stored reference frames may include producing an interpolated reference frame. The interpolated reference frame may be constructed off a closest reference frame. The closest reference frame may be based on an interpolation ratio of the interpolated reference frame. For example, for an interpolation frame A1B1.6 the interpolation ratio is 0.6. With the A1B1.6 frame, the interpolated frame is 0.6 away from A1 and 0.4 away from B1. B1 is used since it is closer than A1. If the A1 frame and B1 frame are equidistant and the A1 frame is no longer needed for generating other frames, then the B1 frame can be used and the A1 frame may be deleted. Deleting the A1 frame can make room for another reference frame to be retained (e.g., a C1 frame).

Figure 10:
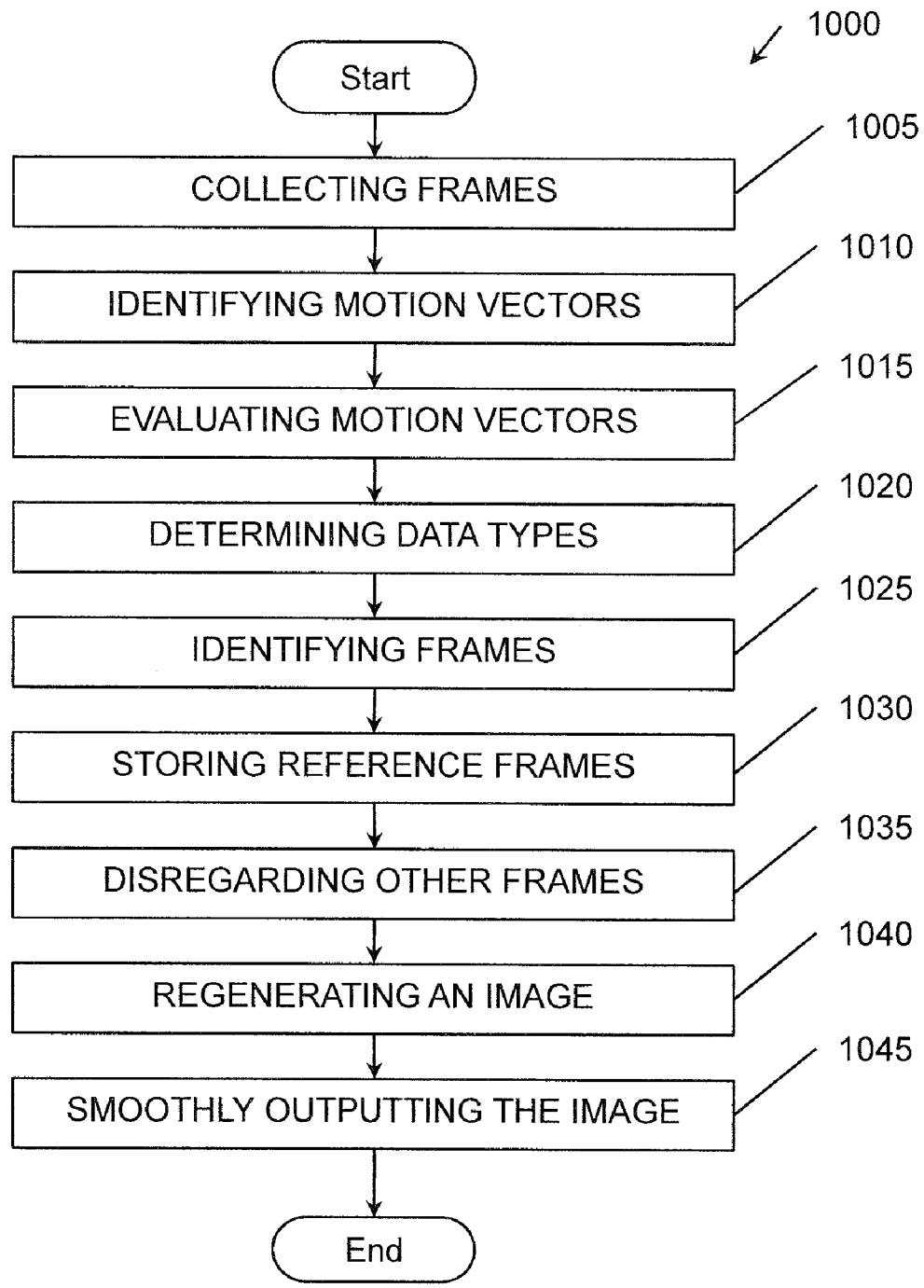
FIG. 10 illustrates one embodiment of a method for processing an image

FIG. 10 represents one embodiment of a method 1000 for processing an image. Since some images may have multiple data types, the types can be identified and processed separately. The data types may be recombined to produce a regenerated image. The regenerated image can be outputted to a display device, retained in storage, and so on. Therefore, a regenerated image can be used that consumes a smaller amount of storage.

The method 1000 initiates and frames of the image are collected (block 1005). The frames are evaluated to identify motion vectors (block 1010). The identified motion vectors are evaluated (block 1015). A check is performed on the collected frames to determine if the image includes more than one data type based, at least in part, on an evaluation result (block 1020). In addition, the evaluation may including identifying a frame cadence. If more than one data type is present, then a primary data type may be identified. The primary data type can be separated from other data types and processed.

Based, at least in part, on the result of the evaluation, primary data type frames of the image are identified as reference frames or as non-reference frames (block 1025). In one embodiment, the identification includes determining that the reference frames have a high amount of change in motion in relation to adjacent frames (e.g. immediately previous or subsequent frames). In another embodiment, the identification may also include determining the frames that have a low amount of change in motion in relation to adjacent frames. These frames are identified as non-reference frames.

The reference frames are stored (block 1030) and the non-reference frames are disregarded (block 1035). The image is regenerated from the stored reference frames (block 1040). This can include performing an interpolation on the stored reference frames. The regenerated image can be smoothly outputted (block 1045). Smooth outputting may include outputting the regenerated image onto a display screen so a video is presented to a viewer in a seamless manner. With method 1000, less storage space is used while producing a visually indistinguishable interpolated image.

In one or more embodiments, method 900 of FIG. 9 and/or the method 1000 may be implemented to be performed by executable instructions stored on a computer-readable medium, at least one circuit, and/or combinations of both.

Figure 11:
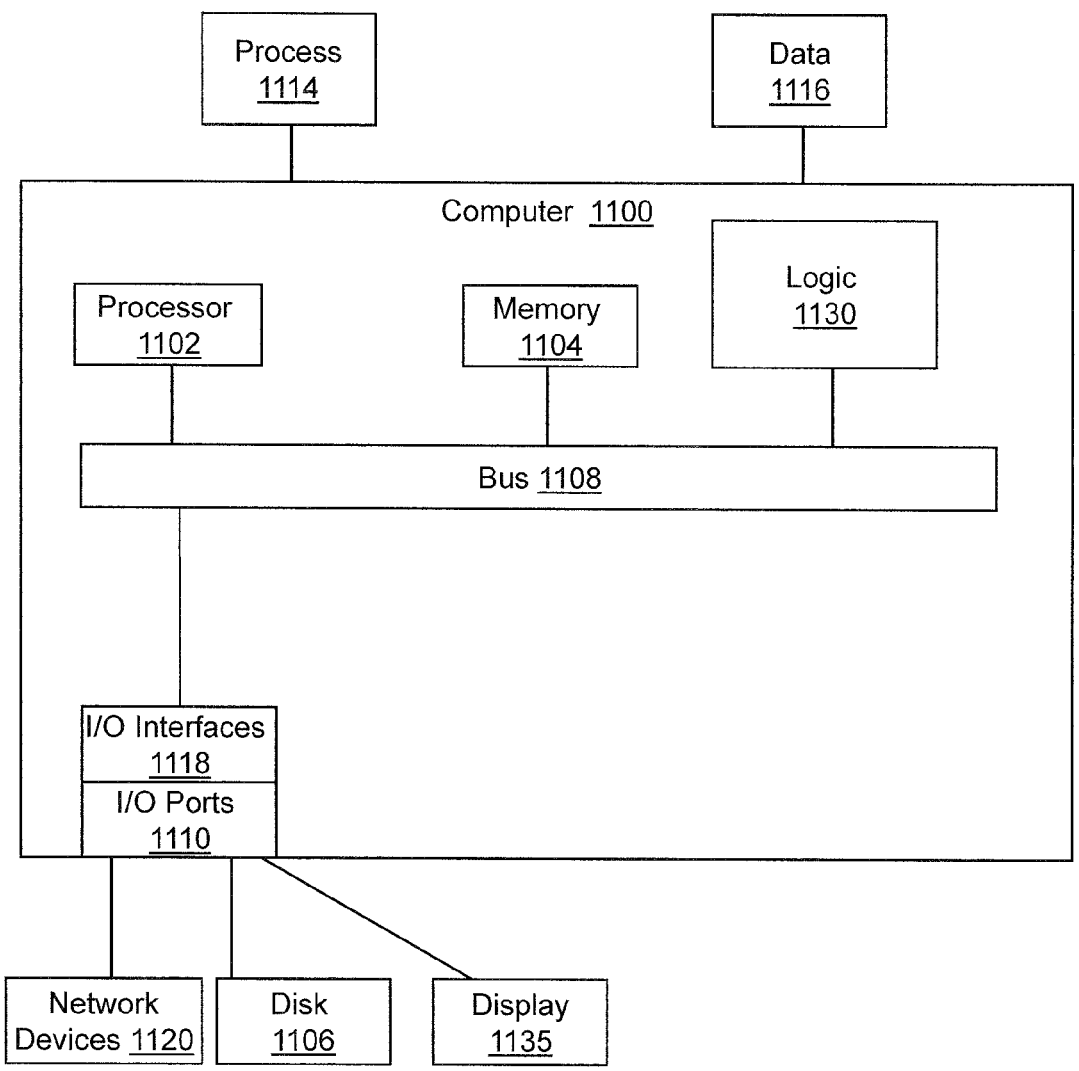
FIG. 11 illustrates one embodiment of a computing device in which example systems and methods described herein, and equivalents, may operate.

FIG. 11 illustrates one embodiment of a computing device in which example systems and methods described herein, and equivalents, may operate.

The example computing device may be a computer 1100 that includes a processor 1102, a memory 1104, and input/output ports 1110 operably connected by a bus 1108. In one embodiment, the computer 1100 may include a logic 1130 that processes an image. In different examples, the logic 1130 may be implemented in hardware, software, firmware, and/or combinations thereof. While the logic 1130 is illustrated as a hardware component attached to the bus 1108, it is to be appreciated that in one example, the logic 1130 could be implemented in the processor 1102.

Thus, logic 1130 may function as at least one logic disclosed herein (e.g., logic of apparatus 100, logic of apparatus 200, and so on). The logic 1130 may be implemented, for example, as an ASIC. The logic 1130 may also be implemented as stored computer executable instructions that are presented to computer 1100 as data 1116 that are temporarily stored in memory 1104 and then executed by processor 1102.

Generally describing an example configuration of the computer 1100, the processor 1102 may be a variety of various processors including dual microprocessor and other multiprocessor architectures. A memory 1104, which can function as a buffer to store a reference frame, may include volatile memory and/or non-volatile memory. Non-volatile memory may include, for example, EEPROM, NAND, NOR, FLASH, ROM, PROM, and so on. Volatile memory may include, for example, RAM, SRAM, DRAM, and so on.

A disk 1106 may be operably connected to the computer 1100 via, for example, an input/output interface (e.g., card, device) 1118 and an input/output port 1110. The disk 1106 may be, for example, a magnetic disk drive, a solid state disk drive, a floppy disk drive, a tape drive, a Zip drive, a flash memory card, a memory stick, and so on. Furthermore, the disk 1106 may be a CD-ROM drive, a CD-R drive, a CD-RW drive, a DVD ROM drive, a Blu-Ray drive, an HD-DVD drive, and so on. The memory 1104 can store a process 1114 and/or a data 1116, for example. The disk 1106 and/or the memory 1104 can store an operating system that controls and allocates resources of the computer 1100.

The bus 1108 may be a single internal bus interconnect architecture and/or other bus or mesh architectures. While a single bus is illustrated, it is to be appreciated that the computer 1100 may communicate with various devices, logics, and peripherals using other busses (e.g., PCIE, 1394, USB, Ethernet). The bus 1108 can be types including, for example, a memory bus, a memory controller, a peripheral bus, an external bus, a crossbar switch, and/or a local bus.

The computer 1100 may interact with input/output devices via the i/o interfaces 1118 and the input/output ports 1110. Input/output devices may be, for example, a keyboard, a microphone, a pointing and selection device, cameras, video cards, one or more display 1135, the disk 1106, the network devices 1120, and so on. In one embodiment, the logic 1130 outputs a regenerated image that is presented on the display 1135. The input/output ports 1110 may include, for example, serial ports, parallel ports, and USB ports.

The computer 1100 can operate in a network environment and thus may be connected to the network devices 1120 via the i/o interfaces 1118, and/or the i/o ports 1110. Through the network devices 1120, the computer 1100 may interact with a network. Through the network, the computer 1100 may be logically connected to remote computers. Networks with which the computer 1100 may interact include, but are not limited to, a LAN, a WAN, and other networks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    classifier logic to categorize frames that represent an image as either reference frames or non-reference frames, where the categorization is based, at least in part, on motion vectors between the frames;
    wherein the categorization includes evaluating the motion vectors to produce a result by analyzing an amount of motion that exists across the frames and wherein the result indicates a cadence pattern of the frames; and wherein the non-reference frames are repeated frames in the cadence pattern;
    management logic to store the reference frames in a buffer and to delete the non-reference frames from the buffer; and
    image generation logic to reproduce the image by using the stored reference frames, wherein the image generation logic comprises:
        interpolation logic to perform an interpolation using the reference frames, wherein a number of interpolated frames generated between two reference frames is based on an output frequency and the cadence pattern and wherein each of the interpolated frames are interpolated based on a relative distance between the two reference frames where an interpolated frame is interpolated from a nearest reference frame of the two reference frames;
        monitor logic to determine that the interpolation using the nearest reference frame is complete; and
        administration logic that deletes the nearest reference frame from the buffer after the monitor logic determines that the interpolation using the nearest reference frame is complete.

2. The apparatus of claim 1, where the image generation logic performs an interpolation on the stored reference frames to reproduce the image.

3. The apparatus of claim 1, where the image generation logic comprises a sum of absolute differences engine to produce interpolated frames from the stored reference frames that represent one or more of the deleted non-reference frames, where the image generation logic is configured to combine the reference frames and the interpolated frames to reproduce the image.

4. The apparatus of claim 3, where the sum of absolute differences engine operates with a double data controller, where the double data controller uses a fixed bandwidth.

5. The apparatus of claim 3, where the sum of absolute differences engine functions on a fixed number of pixels per clock cycle.

6. The apparatus of claim 1, comprising detection logic to detect a cadence of the image and wherein the classifier logic categorizes the frames based, at least in part, on the cadence;
    wherein the non-reference frames are repeated frames in the cadence; and
    wherein the management logic is configured to delete the non-reference frames from the image stored in a storage device.

7. A method, comprising:
    identifying motion vectors between frames of an image, where the frames of the image are identified as reference frames or non-reference frames based on a result produced through evaluation of the identified motion vectors;
    wherein evaluating the identified motion vectors comprises analyzing an amount of motion that exists across the frames and wherein the result indicates a cadence pattern of the frames, and wherein the non-reference frames are repeated frames in the cadence pattern;
    deleting the non-reference frames from the image stored in a storage; storing the reference frames in a buffer;
    regenerating the image by interpolating the stored reference frames, wherein a number of interpolated frames generated between two reference frames stored in a buffer is based on an output frequency and the cadence pattern and wherein each of the interpolated frames are interpolated based on a relative distance between the two reference frames where an interpolated frame is interpolated from a nearest reference frame of the two reference frames; and
    determining when the interpolation using the nearest reference frame is complete and then deleting the nearest reference frame from the buffer.

8. The method of claim 7, comprising:
    evaluating the identified motion vectors to produce the result;
    identifying the frames of the image as reference frames or as non-reference frames based, at least in part, on the result; and
    regenerating the image from the stored reference frames.

9. The method of claim 7, where the regenerating the image from the stored reference frames comprises performing an interpolation of at least one stored reference frame.

10. The method of claim 9, where performing the interpolation comprises producing an interpolated reference frame and where the interpolated reference frame is constructed off a closest reference frame.

11. The method of claim 7, comprising determining that the image includes more than one data type based, at least in part, on the result, wherein a first data type includes content associated with video and a second data type includes content associated with text; and
    wherein the method further comprises extracting out the content associated with text from the image.

12. The method of claim 7, comprising:

collecting the frames of the image before identifying motion vectors between the frames of the image; and after regenerating the image, outputting the regenerated image.

13. A system, comprising:

means for evaluating motion vectors of image data, where the motion vectors are between frames that form the image data;

wherein evaluating the motion vectors comprises analyzing an amount of motion that exists across the frames and wherein a result the evaluating indicates a cadence pattern of the frames;

means for classifying the frames as reference frames or as non-reference frames based, at least in part, on the evaluation, wherein the non-reference frames are repeated frames in the cadence pattern;

means for segregating the classified frames, where the reference frames are retained in a memory and the non-reference frames are deleted from the image data in the memory; and means for reproducing the image data from the retained reference frames including interpolating the reference frames, wherein a number of interpolated frames generated between two reference frames stored in a buffer is based on an output frequency and the cadence pattern and wherein each of the interpolated frames are interpolated based on a relative distance between the two reference frames where an interpolated frame is interpolated from a nearest reference frame of the two reference frames;

wherein the means for reproducing includes hardware configured to determine when the interpolation using the nearest reference frame is complete and then deleting the nearest reference frame from the buffer.

14. The system of claim 13, comprising:

means for determining that the image data includes more than one data type based, at least in part, on the evaluation;

means for identifying a primary data type of the image data upon determining that the image data includes more than one data type; and means for filtering out a non-primary data type from the image data, where the means for classifying functions after the filtering.

15. The system of claim 13, where the means for classifying the frames comprises:

means for identifying a first reference frame of the frames;

means for identifying at least one additional reference frame by applying the cadence pattern against the first reference frame; and means for identifying at least one non-reference frame by applying the cadence pattern against the first reference frame.

16. The system of claim 13, where the means for reproducing interpolates the reference frames to obtain frames representing the deleted non-reference frames.

17. The system of claim 13, where means for reproducing the image data from the retained reference frames comprises:

means for collecting candidate motion vectors;

means for selecting a retained reference frame; and means for testing the candidate motion vectors against pixels of the selected retained reference frame, where the testing is based on a search of the selected retained reference frame and where a search area of the search is a function of an interpolation ratio.

18. The system of claim 13, where the means for reproducing the image data from the stored reference frames comprises means for locking on to a first reference frame of the image data and where the means for classifying the frames comprises means for identifying the first reference frame of the image data.

* * * * *